United States Patent [19]
Gorzinski et al.

[11] Patent Number: 4,497,933
[45] Date of Patent: Feb. 5, 1985

[54] EMULSIFIER-FREE AND SOLVENT-FREE ALKYD RESIN WATER LACQUERS

[75] Inventors: Manfred Gorzinski, Duesseldorf; Hans-Christoph Wilk, Neuss; Herbert Fischer, Duesseldorf; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 561,808

[22] Filed: Dec. 15, 1983

[30] Foreign Application Priority Data

Dec. 16, 1982 [DE] Fed. Rep. of Germany ....... 3246614

[51] Int. Cl.$^3$ .......................... C09D 3/64; C08G 63/20
[52] U.S. Cl. ..................................... 524/604; 106/252; 524/602; 528/291; 528/295.5; 528/296
[58] Field of Search ................. 524/602, 604; 528/291, 528/295.5, 296; 106/252

[56] References Cited

U.S. PATENT DOCUMENTS

| | | | |
|---|---|---|---|
| 2,121,335 | 6/1938 | Barsky et al. | 106/252 |
| 2,870,102 | 1/1959 | Van Strien | 528/295.5 |
| 3,442,835 | 5/1969 | Curtice et al. | 106/252 |
| 3,699,065 | 10/1972 | Clark | 528/295.5 |
| 3,817,932 | 6/1974 | Albers et al. | 528/291 |
| 4,081,411 | 3/1978 | Hunsucker | 106/218 |
| 4,200,560 | 4/1980 | Kubo et al. | 525/437 |
| 4,259,219 | 3/1981 | Eschwey et al. | 524/560 |
| 4,271,051 | 6/1981 | Eschwey | 106/252 |

FOREIGN PATENT DOCUMENTS 1075081  7/1967  United Kingdom ............ 528/295.5

OTHER PUBLICATIONS

Chemical Abstracts, vol. 93, No. 6, Aug. 11, 1980, p. 109, Abstract 93: 48637K.
H. A. Goldsmith, "Alpha- and Beta-Hydroxyls of Glycerol in Preparation of Alkyd Resins", in Industrial and Engineering Chemistry, pp. 1205 to 1211, (Jul. 1948).

Primary Examiner—Ronald W. Griffin
Attorney, Agent, or Firm—Ernest G. Szoke; Henry E. Millson; Mark A. Greenfield

[57] ABSTRACT

Process for the production of alkyd resins having a final acid number of not more than 40 and a high —OH number for use in water lacquers. The resins of the invention can be made up with the aid of aminoalcohols containing more than two hydroxyl groups into optically clear water lacquers which are distinguished both by their lack of environmental problems and also by their advantageous lacquer properties.

13 Claims, No Drawings

EMULSIFIER-FREE AND SOLVENT-FREE ALKYD RESIN WATER LACQUERS

This invention relates to alkyd resin water lacquers and to a process for the production of a stoving alkyd resin which can be made up into water lacquers without the assistance of auxiliary solvents and emulsifiers. This invention also relates to the production of the above aqueous preparations.

BACKGROUND OF THE INVENTION

There are several known processes for the production of water lacquers from alkyd resins. These known processes can be divided into two main types. One type of alkyd resin can be made up into aqueous dispersions using emulsifiers or hydrophilic resins (emulsifier resins). Dispersions such as these generally contain no auxiliary solvents. However, they have the disadvantage of inadequate resistance to water; in other words, the lacquer film shows a tendency towards redispersion even after drying, for example by stoving. In most cases, it is also not possible to produce high-gloss lacquer films with such resins.

The second process type for producing alkyd resin water lacquers comprises dissolving alkyd resins after neutralization. In most cases, this involves the use of considerable quantities of organic solvents, which offsets the main advantage of water lacquers, namely, their lack of harmful effects on the environment.

Another method for producing alkyd resin water lacquers comprises the subject matter of German patent application No. 28 42 919. In this known process, alkyd resins having acid numbers of from 30 to 180 mg of KOH/g are initially prepared and then esterified by the action of glycidol up to an acid number of from 5 to 35, preferably from 15 to 30. The resins thus produced, which contain 2,3-dihydroxypropyl groups, are then neutralized with substantially nonvolatile amino alcohols and made up into water lacquers with the assistance of emulsifiers which lose their hydrophilicity on stoving. A special variant of this process is described in German patent application No. 28 42 919. According to that variant, resins containing 2,3-dihydroxypropyl groups can also be produced by the action of glycerol on alkyd resins having a high acid number.

Accordingly, resins containing 2,3-dihydroxypropyl groups have the advantage that they can be made up into water lacquers without any need to use volatile constituents, such as solvents or even volatile amines. However, emulsifiers still have to be used. Although emulsifiers which lose their hydrophilicity on stoving, i.e. heat-reactive emulsifiers which are split into fragments at elevated temperatures, or emulsifiers which are incorporated in the resin by stoving through hydroxyl groups, have been proposed for this purpose, both these types of emulsifiers can produce faults in the lacquer film such as yellowing as a result of chemical reaction during stoving; the exuding of fragments, i.e. fragments collect at the interface with the lacquered substrate and, hence, interfere with adhesion; or because overly narrow crosslinking occurs, resulting in embrittlement under stoving conditions due to the presence of numerous hydroxyl groups. Thus, glycerol-modified resins in particular are attended by the disadvantage of minimal processing tolerance, which means that coatings combining adequate hardness with adequate flexibility can only be obtained under very specially selected stoving conditions. However, where lacquering is carried out industrially on the assembly-line principle, stoving conditions often cannot be kept constant enough to produce uniformly acceptable results.

Additionally, the starting material, glycidol (2,3-epoxypropanol), is difficult to handle. Hence, there is a need for new alkyd resins which can be produced by a process that does not involve the use of glycidol and which results in alkyd resins that can be made up into water lacquers without the assistance of organic solvents or emulsifiers.

DESCRIPTION OF THE INVENTION

Accordingly, a first object of the present invention is to provide a process for the production of a hydrophilic alkyd resin having an acid number of <40, which does not involve the use of glycidol as a starting material, and wherein the resulting resin can be made up into a solvent-free and emulsifier-free aqueous preparation. Another object of the invention is to provide alkyd resins which are only hydrophilic to the extent that, using solubilizing amino alcohols as neutralizing agents, they are still capable of being made up into clear, aqueous preparations, yet give particularly water-resistant coatings after stoving. Another object of the invention is to provide aqueous alkyd resin solutions which contain the alkyd resin and an amino alcohol as a neutralizing agent.

Hence, the present invention relates to a process for the production of aqueous alkyd resin preparations by the condensation of fatty acids and polybasic carboxylic acids with polyfunctional alcohols in two stages up to a final acid number not greater than about 40, preferably from about 15 to about 40, followed by dissolution in the presence of amines, wherein in a first stage from about 8 to about 16 mole percent of cuts of straight-chain or branched-chain fatty acids are condensed with from about 25 to about 45 mole percent of dihydroxy compounds and from about 14 to about 28 mole percent of trihydroxy compounds or higher hydroxy compounds up to an acid number of <5 and, in a following stage, from about 13 to about 25 mole percent of dicarboxylic acids and from about 8 to about 15 mole percent of tricarboxylic acids and/or their anhydrides are added to the reaction product of the first stage and condensation is carried out until an alkyd resin is obtained with a final acid number of not more than about 40, followed by dissolution thereof in water in the absence of organic solvents and emulsifiers by the addition of amino alcohols containing more than 2 hydroxyl groups in the molecule.

Accordingly, the process of the invention comprises three stages. In the first stage, fatty acids are heated with a large excess of hydroxy compounds until virtually no more free carboxyl groups are present. In the second stage, acid groups are introduced through reaction with dicarboxylic and tricarboxylic acids and a resin is produced by condensation. The third stage comprises neutralization with selected amino alcohols.

In the first stage, as stated above, from about 8 to about 16 mole percent of cuts of straight-chain or branched-chain fatty acids are reacted with from about 25 to about 45 mole percent of dihydroxy compounds and from about 14 to about 28 mole percent of trihydroxy or higher hydroxy compounds. It is preferred to use from about 11 to about 14 mole percent of straight-chain or branched-chain fatty acids together with from about 31 to about 39 mole percent of dihydroxy compounds and from about 19 to about 24 mole percent of trihydroxy or higher hydroxy compounds. The fatty acids preferably contain from 8 to 22 carbon atoms; the dihydroxy compounds preferably contain from 2 to 30 carbon atoms; the trihydroxy compounds preferably contain from 3 to 30 carbon atoms, more preferably from 3 to 12 carbon atoms; and the higher hydroxy compounds preferably contain no more than 75 carbon atoms. However, while preferred, the above carbon atom ranges are not critical. Esterification of the fatty acids with the polyfunctional hydroxy compounds is carried out at temperatures in the range of from about 100° to about 250° C. The esterification reaction can be carried out in the presence of an inert solvent, such as for example xylene, which forms an azeotrope with the water of reaction so that the water of reaction is removed from the system. In one preferred embodiment, however, the esterification reaction is carried out in the absence of such a solvent, which would subsequently have to be removed from the resin, and the water of reaction formed is removed by passing an inert gas, such as nitrogen or argon for example, through the reaction mixture. If desired, standard esterification catalysts, such as for example acids, particularly 4-toluene sulfonic acid, can be present.

From about 13 to about 25 mole percent and preferably from about 17 to about 22 mole percent of dicarboxylic acids and from about 8 to about 15 mole percent and preferably from about 10 to about 13 mole percent of tricarboxylic acids are present at the beginning of the second stage. Preferably the dicarboxylic acids contain from 3 to 10 carbon atoms, and the tricarboxylic acids contain from 4 to 20 carbon atoms. However, while the above carbon atom ranges are preferred, resins having useful characteristics can result from the use of acids having carbon atoms outside the above ranges. Alternatively, the anyhydrides of the dicarboxylic and tricarboxylic acids can be used instead of the acids. The dicarboxylic acids are added at the reaction temperature of the first stage. However, if the corresponding anhydrides are used, they are preferably added at a temperature in the range of from about 100° to about 150° C. Esterification is then carried out under the conditions maintained in the first stage until the acid number has fallen to 40 or less. It is preferred to produce resins having acid numbers of from about 15 to about 40 and, more particularly, from about 20 to about 30. Resins having acid numbers of from about 20 to about 25 show particularly favorable properties.

On reaching the desired acid number, the resins are cooled and neutralized by the addition of an amino alcohol either in the same molar quantity or in an excess of up to about 20 mole percent. In order to obtain preparations which are pourable at room temperature, it is advisable to prepare aqueous solutions. In one preferred embodiment, aqueous solutions having a solids content of from about 70 to about 85% by weight are prepared. Highly concentrated aqueous resin solutions such as these remain stable in storage for many months. They are optically clear and may be further diluted with water as required after they have been neutralized with solubilizing amino alcohols.

Alkyd resins having particularly favorable properties, which do not gel even with acid numbers below 20, are obtained when a molar ratio of carboxyl to hydroxyl groups of from about 1:1.4 to about 1:1.8, and preferably from about 1:1.5 to about 1:1.7 is maintained, consistent with the limitations specified for the starting materials.

To carry out the process according to the invention, fatty acids are used in the first stage. In contrast to the quantitative ratios between the starting materials, the type of fatty acids used is not critical. Thus, it is possible to use natural or synthetic fatty acids, unsaturated and also saturated pure acids or cuts. It is preferred to use either branched fatty acids, such as isononanoic acid, isopalmitic acid, isostearic acid, or cuts of natural fatty acids, particularly those which have been produced from the following oils: coconut oil, tallow oil, soy oil, sunflower oil, peanut oil, castor oil, fish oil, linseed oil, rape oil, palm oil or palm kernel oil. Where fatty acid cuts containing a high percentage of $C_{18}$-fatty acids are used, the lacquers obtained are more flexible than those obtained using shorter-chain (e.g. $C_{12}$) fatty acids. However, flexibilization can also be obtained by other means, for example, by using polyols containing more than 6 C-atoms between the —OH groups.

A large number of commercially obtainable glycols can be used as dihydroxy compounds in the process of the invention, including for example ethylene glycol diethylene glycol, etc, propylene glycol, neopentyl glycol, butane diol, and hexane diol. In one preferred embodiment of the process, the dihydroxy compounds used are not volatile under condensation conditions. In addition to neopentyl glycol, dihydroxy compounds of this type also include the ring opened products of 1,2-epoxy alkanes, such as for example 1,2-dihydroxy octane.

Any of the triols known to those skilled in the art of alkyd resins can be used as the trihydroxy compound for producing the resins of the invention. These triols are usually glycerol, trimethylol ethane, or trimethylol propane. In one particularly preferred embodiment, however, the process according to the invention is carried out with at least partial replacement of the above-mentioned triols by their reaction products with ethylene oxide, propylene oxide, butene oxide or isobutene oxide in a molar ratio of from about 1:3 to about 1:40. In addition, the triols can be replaced by the reaction product of pentaerythritol with ethylene oxide, propylene oxide, butene oxide or isobutene oxide in a molar ratio of from about 1:3 to about 1:40, providing steps are taken to ensure that the number of hydroxyl groups remains constant.

In another preferred embodiment of the invention, the process is carried out by replacing the trihydroxy compounds at least partly by reaction products of epoxidized fatty acid esters and/or amides and/or epoxidized fatty alcohols with alcohols or phenols wherein such reaction products contain 3 to 6 hydroxy groups. Particularly suitable starting materials are the reaction products of epoxidized triglycerides with glycols, the ring opened and transesterification products of epoxidized fatty acid alkyl esters with glycols and/or triols and the ring opened products of epoxidized fatty alcohols with glycols and/or triols. For acid-catalyzed ring opening, it is preferred initially to introduce the alcohol or phenol and catalytic quantities of an acid, for example sulfuric acid, phosphoric acid, 4-toluene sulfonic acid or acid ion exchangers, into the reaction vessel and then to add the epoxidized fatty acid derivative or epoxidized fatty alcohol in portions at temperatures in the range of from about 50° to about 130° C. and preferably at temperatures in the range of from about 70° to about 100° C.

The course of the reaction may be followed by gas chromatography or by titration of the residual epoxide oxygen. The epoxidized component is quantitatively reacted after reaction times of from about 2 to about 6 hours and preferably of from about 3 to about 5 hours, depending on the size of the batch and the addition rate. At the end of the reaction, the acid catalyst can be neutralized by suitable bases. Readily volatile constituents, such as for example unreacted hydroxy compounds, can be distilled off in vacuo.

Acid catalysis is preferred for use in the above process wherein the epoxidized component is reacted with polyfunctional aliphatic alcohols. Other variants of the process can also be used for carrying out the acid-catalyzed ring-opening reaction. Thus, all the starting materials can be simultaneously introduced into the reaction vessel or, alternatively, either the hydroxy component or the epoxidized component can be added incrementally.

The ring opening of the epoxidized component with phenols is preferably base-catalyzed. Suitable bases are, for example, alcoholates or phenolates of alkali metals or tertiary amines. The base-catalyzed reaction is carried out at temperatures in the range of from about 100° to about 180° C. and preferably at temperatures in the range of from about 120° to about 160° C. In this instance, it is preferred to introduce all the reaction components into the reaction vessel at the same time, although it is possible here also to initially introduce separately either the phenols or the epoxidized component to the reaction vessel. In general, the base-catalyzed reaction takes somewhat longer than the acid-catalyzed reaction. Thus, complete conversion is obtained, for example, after 4 to 8 hours. On completion of the reaction, the catalysts can be destroyed by the addition of an acid. It is then advisable to wash the reaction products free from salts and/or to distill off volatile constituents in vacuo.

In the above reaction between the epoxidized component and the alcohol or phenol, the alcohol or phenol is present in at least an equimolar quantity, and preferably in excess, e.g. up to a 10 molar excess.

Preferred dicarboxylic acids are aromatic dicarboxylic acids, particularly phthalic acid, isophthalic acid and terephthalic acid; phthalic acid preferably being used in the form of its anhydride. Other suitable dicarboxylic acids are aliphatic dicarboxylic acids, such as adipic acid, maleic acid, maleic acid anhydride, succinic acid, glutaric acid or sebacic acid. Particularly preferred dicarboxylic acids are cyclic aliphatic dicarboxylic acids, such as for example tetrahydrophthalic acid, which can also be used in the form of its anhydride. Instead of using the dicarboxylic acids or their anhydrides, it is also possible to use their esters with short-chain aliphatic alcohols such as, for example, methanol or ethanol, or even their semiesters. Thus, dimethyl terephthalate, for example, is another preferred starting material.

The preferred tricarboxylic acid is trimellitic acid which can also be used in the form of its anhydride or ester.

In order to improve the resistance of the stoved lacquers to water, the resins according to the invention should be hydrophobized to the extent that they can only be made up into clear water lacquers with the aid of solubilizing amines. Thus, solutions or dispersions cannot be prepared for example by neutralization with ammonia, even in excess (pH >8). With ammonia, the resin sediments in lumpy form. Although no exact relationship between the chemical structure of suitable amines and their solubilizing effect was observed, the presence of three hydroxyl groups or more was found to be essential. Of the amino alcohols containing at least three hydroxyl groups, primary amino alcohols, such as tris-methylol aminomethane for example, show only a moderate solubilizing effect. Triethanolamine and the adducts of ethylene oxide or propylene oxide with 2-methyl-2-aminopropanol or 2-methyl-2-aminopropane diol are also only moderately suitable. Primary, secondary and tertiary amino alcohols obtainable by the addition of glycidol with ammonia also show only a moderate solubilizing effect. Mixtures of these substances are also only moderately suitable.

It has surprisingly been found that the reaction products of 2 moles of glycidol with 1 mole of mono-alkylamine or 1 mole of mono-(hydroxyalkyl)-amine represent effective solubilizing neutralizing agents. It is preferred that the alkyl groups in the above alkyl and hydroxyalkyl amines contain no more than 6 carbon atoms. Other suitable solubilizing neutralizing agents are the reaction products of di-(hydroxyalkyl)-amines with 1 mole of glycidol and the reaction products of alkyl hydroxyalkyl amines with 1 mole of glycidol. Of these compounds, the reaction product of bis-(2-hydroxypropyl)-amine with 1 mole of glycidol, and the reaction product of diethanolamine with 1 mole of glycidol are preferred. Other preferred solubilizing amino alcohols include the reaction products of methylamine, ethylamine, propylamine, n-butylamine, pentylamine or hexylamine with 2 moles of glycidol. Particularly preferred solubilizing amino alcohols are 2-methyl-2-aminopropanol-2-glycidol, 2-methyl-2-amino-propane diol-2-glycidol, and 2-aminopropanol-2-glycidol.

To produce aqueous resin preparations, the solubilizing amines are added to the resins in such quantities that a pH-value in the range of from about 6.5 to about 8, and preferably in the range of from about 7 to about 7.5 is established. Stoichiometric quantities ±20 mole percent are required for this purpose. Where the preferred neutralizing agents are used, optically clear resin solutions are formed which can be diluted to spraying viscosity without phase separation occurring.

The aqueous preparations of the alkyd resins according to the invention can be further processed with standard additives to form water lacquers. Reference is made here to the book entitled "Waterborne Coatings" by Charles R. Martens, Van Nostrand Reinhold Co., N.Y., 1981 with respect to the preparation of water lacquers, the general teachings of which are applicable to the alkyd resins of the invention. In order to obtain stoving water lacquers, crosslinking resin components are added. Particularly suitable crosslinking resin components are so-called amino resins and among these the reaction products of melamine, hexamethylol melamine hexa-alkyl ethers, are particularly suitable. Particularly preferred are amino resins of the type which are solvent-free or at least substantially solvent-free or aqueous preparations. Several commercial products of this type are known to those skilled in this art.

Water lacquers based on the alkyd resins prepared in accordance with the invention can be pigmented by conventional methods. More specifically, general knowledge of water lacquers, particularly so far as the choice of pigments and other auxiliaries is concerned, is applicable here. Stoving of the lacquer films is carried out, if desired, after preliminary drying, at temperatures in the range of from about 120° to about 180° C., depending on the amino resin used, in suitable drying ovens or drying tunnels. In this connection, advantages are obtained by not using any organic auxiliary solvents whatever and by not using any volatile amines.

The lacquers containing the alkyd resins of the invention can be used for coating a variety of different materials, such as glass or metals, for example aluminum, iron, steel and the like.

The invention will be illustrated by the following examples, which are given for illustration purposes only and not for purposes of limitation.

EXAMPLES

Production of the Alkyd Resins

The condensation reaction was carried out under nitrogen in a heatable spherical glass flask equipped with a stirrer and water separator. The water of reaction was driven out by the introduction of nitrogen or, alternatively, was removed from the system in the form of an azeotropically boiling mixture with xylene (5% of xylene, based on the mixture as a whole). Where this latter procedure is adopted, the solvent is removed at the end of the second condensation stage.

General Procedure

1st stage
1.10 moles of fatty acid
3.00 moles of dihydroxy compound
1.83 moles of trihydroxy compound
0.005 mole of toluene-4-sulfonic acid, nitrogen or 100 ml of xylene.

The mixture is heated to 150°–200° C. until 1.10 moles of water have been split off (approx. 2 to 6 hours). The reaction mixture is then cooled to approximately 100° C.

2nd stage
1.67 moles (247 g) of phthalic acid anhydride and
1.00 mole (192 g) of trimellitic acid anhydride
are added to the reaction mixture of the 1st stage. Condensation is carried out under nitrogen until the acid number is between 25 and 30 mg of KOH/g. To that end, approximately 3.3 moles of water are split off; the reaction time is about 4 hours.

3rd stage
Amine, for example the adduct of 2 moles of glycidol with 1 mole of 2-amino-2-methyl-1-propanol in the form of a 50% aqueous solution, is added to the resin in a quantity corresponding to the acid number.

In order to obtain pourable resins, the resin is then diluted with water to a solids content of 85%.

EXAMPLE 1

The following reactants were used in the 1st stage:
170 g (1.1 moles) of short-chain fatty acids (2% caproic acid, 60% caprylic acid, 35% capric acid, 3% lauric acid)
179 g (1.33 moles) of trimethylol propane (TMP)
241 g (0.5 Mole) of the adduct of 6 moles of propylene oxide with 1 mole of TMP
312 g (3.00 moles) of neopentyl glycol
1 g (0.005 mole ) of toluene-4-sulfonic acid.
The reaction time was 2 hours. The acid number after the 2nd stage was 25.0. The resin was neutralized with 288 g of a 50% aqueous solution of the adduct of 2 moles of glycidol with 1 mole of 2-amino-2-methyl propanol and then diluted. Approximately 1650 g of an aqueous resin solution (solids content 85%) was obtained.

EXAMPLE 2

The procedure was identical to that used in Example 1, except that 280 g (approx. 1.1 mole) of conjugated fatty acids (2% myristic acid, 6% palmitic acid, 1% stearic acid, 31% oleic acid, 60% linoleic acid, 45 to 52% thereof being conjugated dienes) was used as the fatty acid. The reaction time was 3 hours for the 1st stage. The acid number after the 2nd stage was 25.2. The resin was neutralized with 290 g of a 50% aqueous solution of the adduct of 2 moles of glycidol with 1 mole of 2-amino-2-methyl propanol and then diluted. Approximately 1800 g of an aqueous resin solution (solids content 85%) were obtained.

EXAMPLE 3

The procedure was identical to that used in Example 1, except that 180 g of nonanoic acid was used as the fatty acid. The reaction time in the 1st stage was 4 hours. The acid number after the 2nd stage was 27.4. Neutralization: 292 g of the solution used for this purpose in Example 1. Approx. 1650 g of an aqueous 85% resin solution were obtained.

EXAMPLE 4

The procedure was identical to that used in Example 1, except that 180 g of isononanoic acid was used as the fatty acid. The reaction time in the 1st stage was 4.5 hours. The acid number after the 2nd stage was 27.6. Neutralization: 296 g of the solution used for this purpose in Example 1. Approximately 1650 g of an aqueous 85% resin solution were obtained.

EXAMPLE 5

The procedure was identical to that used in Example 1, except that 285 g of technical isopalmitic acid (acid number 217) was used as the fatty acid. The reaction time in the 1st stage was 4.5 hours. The acid number after the 2nd stage was 25.7. Neutralization: 294 g of the solution of Example 1. Approximately 1800 g of an aqueous 85% resin solution were obtained.

EXAMPLE 6

The procedure was identical to that used in Example 1, except that the trimethylol propane was replaced by 127 g (1.33 moles) of glycerol (95%). The reaction time in the 1st stage was 2.5 hours. The acid number after the 2nd stage was 27.1. Neutralization: 275 g of the solution used for this purpose in Example 1. Approximately 1600 g of an 85% aqueous resin solution were obtained.

EXAMPLE 7

The procedure was identical to that used in Example 1, except that 245 g (1.83 moles) of trimethylol propane (TMP) was exclusively used as the triol. The reaction time in the first stage was 2 hours. The acid number after the second stage was 29.9. Neutralization: 270 g of the solution used for this purpose in Example 1. Approximately 1450 g of an 85% aqueous resin solution were obtained.

EXAMPLE 8

The procedure was identical to that used in Example 7, except that the TMP was replaced by 170 g (1.83 moles) of 99.5% glycerol. The reaction time in the first stage was 2.5 hours. The acid number after the second stage was 26.3. Neutralization: 218 g of the solution used for this purpose in Example 1. Approximately 1300 g of an 85% aqueous resin solution were obtained.

EXAMPLE 9

The procedure was identical to that used in Example 1, except that the adduct of propylene oxide with trimethylol propane was replaced by 240 g of the ring opened product of an epoxidized soy oil with an excess of ethylene glycol (—OH number 311). The reaction time in the first stage was 3 hours. The acid number after the second stage was 23.8. Neutralization: 254 g of the solution used for this purpose in Example 1. Approximately 1600 g of an 85% aqueous resin solution were obtained.

EXAMPLE 10

The procedure was identical to that used in Example 9, except that 240 g of the ring opened product of an epoxidized oleyl alcohol (iodine number 96 before epoxidation) with an excess of ethylene glycol (—OH number 409) was used. The reaction time in the first stage was 3 hours. The acid number after the second stage was 24.3. Neutralization: 260 g of the solution used for this purpose in Example 1. Approximately 1600 g of an 85% aqueous resin solution were obtained.

EXAMPLE 11

The procedure was identical to that used in Example 9, except that 240 g of the ring opened and transesterification product of epoxystearic acid methyl ester with a multiple molar excess of ethylene glycol (—OH number 392) was used. The reaction time in the first stage was 3 hours. The acid number after the second stage was 28.0. Neutralization: 290 g of the solution used for this purpose in Example 1. Approximately 1600 g of an 85% aqueous resin solution were obtained.

COMPARISON EXAMPLE

A fatty acid-modified alkyd resin containing 2,3-dihydroxypropyl groups was produced. Condensation was carried out in the usual way under nitrogen in a heatable esterification apparatus. The components for the first stage were heated together or in stages in the presence of 4.00 kg of xylene until the required acid number was reached.

The following components were condensed:
6.16 kg of fractionated fatty acids (chain length distribution:
  60% by weight caprylic acid
  35% by weight capric acid
  3% by weight lauric acid
  2% by weight higher fatty acids)
2.28 kg of glycerol
2.11 kg of trimethylol propane
11.08 kg of neopentyl glycol
9.88 kg of phthalic acid anhydride
7.68 kg of trimellitic acid anhydride.
  Reaction time: 4 hours.
  Reaction temperature: max. 190° C.
  Acid number: 71.8 (product 1).
  2.25 kg of water were separated out and the xylene was removed by distillation in vacuo.

In a second stage, the following components were reacted:
40.99 kg of alkyd resin (product 1, acid No. 71.8)
2.64 kg of glycidol
1.20 kg of a 50% aqueous solution of glyceryl amine (adduct of 1 mole of 2-amino-2-methyl propanol and 2 moles of glycidol).
  Reaction time: 90 minutes.
  Reaction temperature: max. 140° C.
  Acid number: 25.2.

The alkyd resin so prepared was mixed while heating with 4.90 kg of a 50% aqueous solution of the adduct of 7.5 moles of glycidol with 1 mole of nonyl phenol as an auxiliary emulsifier and 9.20 kg of a 50% aqueous solution of the adduct of 2 moles of glycidol with 1 mole of 1-amino-2-methyl propanol. 2.06 kg of water were then added so that an alkyd resin microemulsion having a solids content of 85% was formed.

Production of a white lacquer

A ground paste was prepared in a dissolver from (parts by weight)
50 parts of alkyd resin, 85% in water
32 parts of deionized water
30 parts of pigmenting aids (9 parts of a 30% acid-group-containing low molecular weight acrylate dispersion—PRIMAL I 94, a product of the ROHM & HAAS Co.—and 1 part of 2-methyl-2-aminopropanol-2-glycidol, 75% in water)
183 parts of titanium dioxide (KRONOS TITAN CL 310).

A lacquer was made up with
309 parts of alkyd resin, 85% in water
131 parts of melamine resin (CYMEL 301, a product of AMERICAN CYANAMID CO.)
265 parts of deionized water
1000 parts of white lacquer having an alkyd resin to melamine resin ratio of 7:3 and a pigment volume concentration of approximately 11% were obtained.

To test the films, the lacquers were sprayed onto steel plates and stoved at 160° C. The dry films were between 40 and 50 μm thick. The results obtained are shown in the following Table.

TABLE

| Example No. | Stoving time (mins) | Film thickness (μm) | Gloss at 20° (%) | Konig pendulum hardness (secs.) | Erichsen indentation (mm) | Bending test (3 mm) |
|---|---|---|---|---|---|---|
| 1 | 15 | 50 | 80 | 125 | 7.3 | + |
| 2 | 25 | 40 | 77 | 94 | 8.7 | + |
| 3 | 20 | 45 | 77 | 109 | 7.8 | + |
| 4 | 15 | 45 | 82 | 163 | 7.8 | + |
| 5 | 30 | 40 | 74 | 122 | 6.1 | + |
| 6 | 15 | 40 | 89 | 177 | 5.5 | + |
| 7 | 10 | 40 | 84 | 125 | 8.3 | + |
| 8 | 15 | 40 | 83 | 190 | 5.2 | + |
| 9 | 20 | 45 | 81 | 128 | 7.1 | + |
| 10 | 15 | 40 | 83 | 134 | 7.0 | + |
| 11 | 15 | 40 | 81 | 115 | 6.8 | + |
| Comparison | 10 | 45 | 80 | 60 | 8.4 | + |

TABLE-continued

| Example No. | Stoving time (mins) | Film thickness (μm) | Gloss at 20° (%) | Konig pendulum hardness (secs.) | Erichsen indentation (mm) | Bending test (3 mm) |
| --- | --- | --- | --- | --- | --- | --- |
| Comparison | 15 | 45 | 86 | 151 | 3.1 | — |
| Comparison | 20 | 45 | 81 | 196 | 2.7 | — |

What is claimed is:

1. A process for the preparation of an aqueous alkyd resin composition comprising the steps of
    (a) reacting together (i) from about 8 to about 16 mole % of at least one straight chain or branched chain fatty acid, (ii) from about 25 to about 45 mole % of at least one dihydroxy compound, and (iii) from about 14 to about 28 mole % of at least one polyhydroxy compound having at least three hydroxy groups, to form a product having an acid number <5;
    (b) reacting the product of step (a) with from about 13 to about 25 mole % of at least one dicarboxylic acid or dicarboxylic acid anhydride or short chain esters or semiesters thereof and from about 8 to about 15 mole % of at least one tricarboxylic acid or tricarboxylic acid anhydride until a product having an acid number of not more than about 40 is obtained; and
    (c) dissolving the product from step (b) in water by the addition of a solubilizing quantity of an amino alcohol containing more than 2 hydroxy groups.

2. A process in accordance with claim 1 wherein in step (a) from about 11 to about 14 mole % of at least one straight chain or branched chain fatty acid, from about 31 to about 39 mole % of at least one dihydroxy compound, and from about 19 to about 24 mole % of at least one polyhydroxy compound is present.

3. A process in accordance with claim 2 wherein in step (b) from about 17 to about 22 mole % of at least one dicarboxylic acid and from about 10 to about 13 mole % of at least one tricarboxylic acid or tricarboxylic acid anhydride is present.

4. A process in accordance with claim 1 wherein the product of step (b) has an acid number of from about 15 to about 40 mg of KOH/g of resin.

5. A process in accordance with claim 4 wherein said acid number is from about 20 to about 30 mg of KOH/g of resin.

6. A process in accordance with claim 1 wherein the ratio of carboxyl to hydroxyl groups in the product of step (b) is from about 1:1.4 to 1:1.8.

7. A process in accordance with claim 6 wherein said ratio is from about 1:1.5 about 1:1.7.

8. A process in accordance wth claim 1 wherein the polyhydroxy compound in step (a) contains the reaction product of glycerol, trimethylol propane or pentaerythritol with ethylene oxide, propylene oxide, butene oxide, or isobutene oxide in a molar ratio of the former to the latter of from about 1:3 to about 1:40.

9. A process in accordance with claim 1 wherein the polyhydroxy compound in step (a) contains the reaction product of an epoxidized fatty alcohol or epoxidized fatty acid ester with a polyfunctional hydroxy compound.

10. A process in accordance with claim 1 wherein the aminoalcohol in step (c) contains more than 3 hydroxyl groups.

11. A process in accordance with claim 1 wherein the aminoalcohol in step (c) is the reaction product of glycidol with an alkyl amine having up to 6 carbon atoms and a terminal or internal amino group.

12. A process in accordance with claim 11 wherein the aminoalcohol in step (c) is 2-methyl-2-aminopropanol-2-glycidol.

13. A process for the preparation of a water lacquer comprising the steps of
    (a) preparing an aqueous alkyd resin composition in accordance with the process of claim 1, and
    (b) adding to said aqueous alkyd resin composition water lacquer adjuvant materials.

* * * * *